United States Patent Office 3,510,548
Patented May 5, 1970

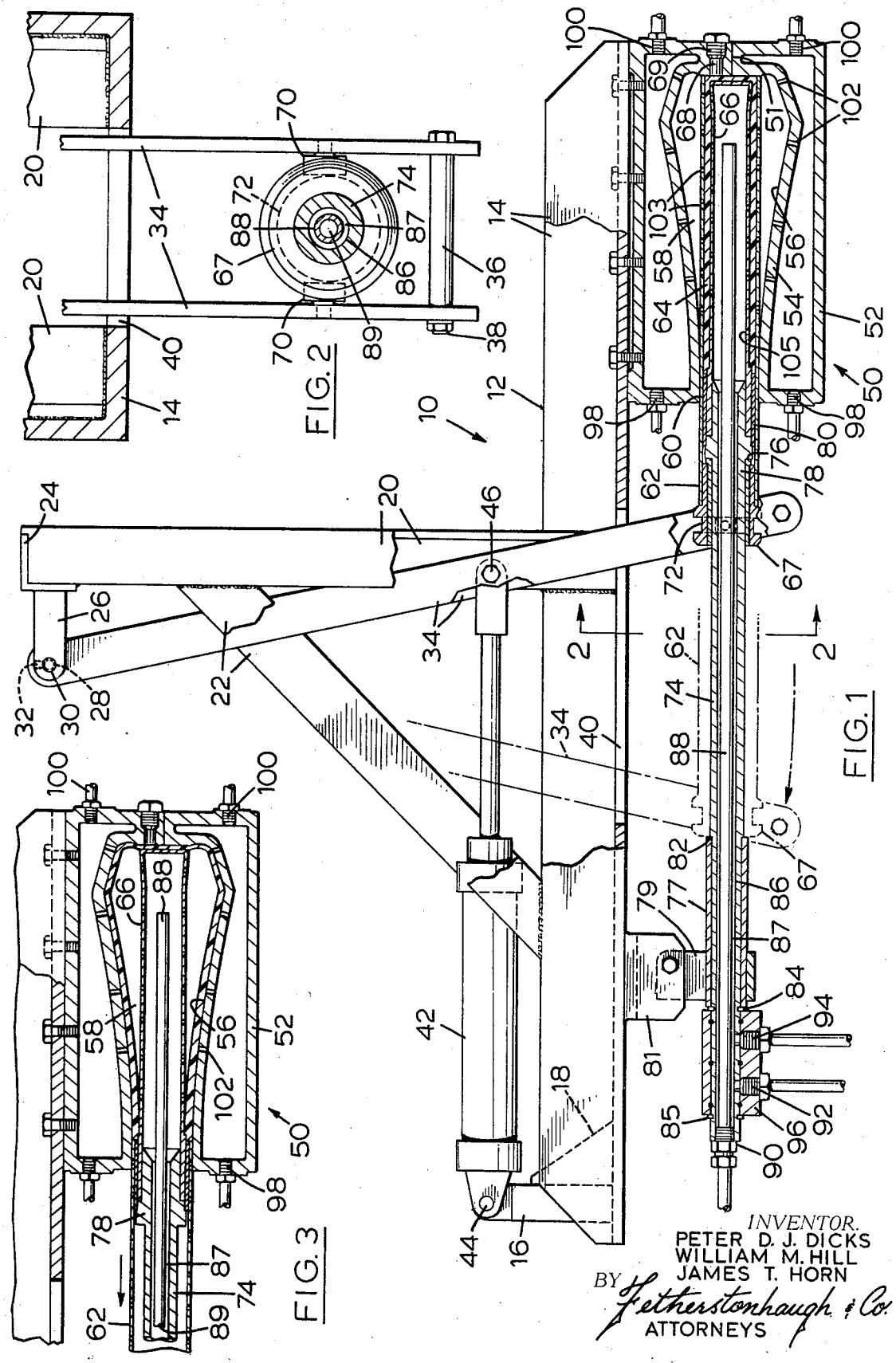

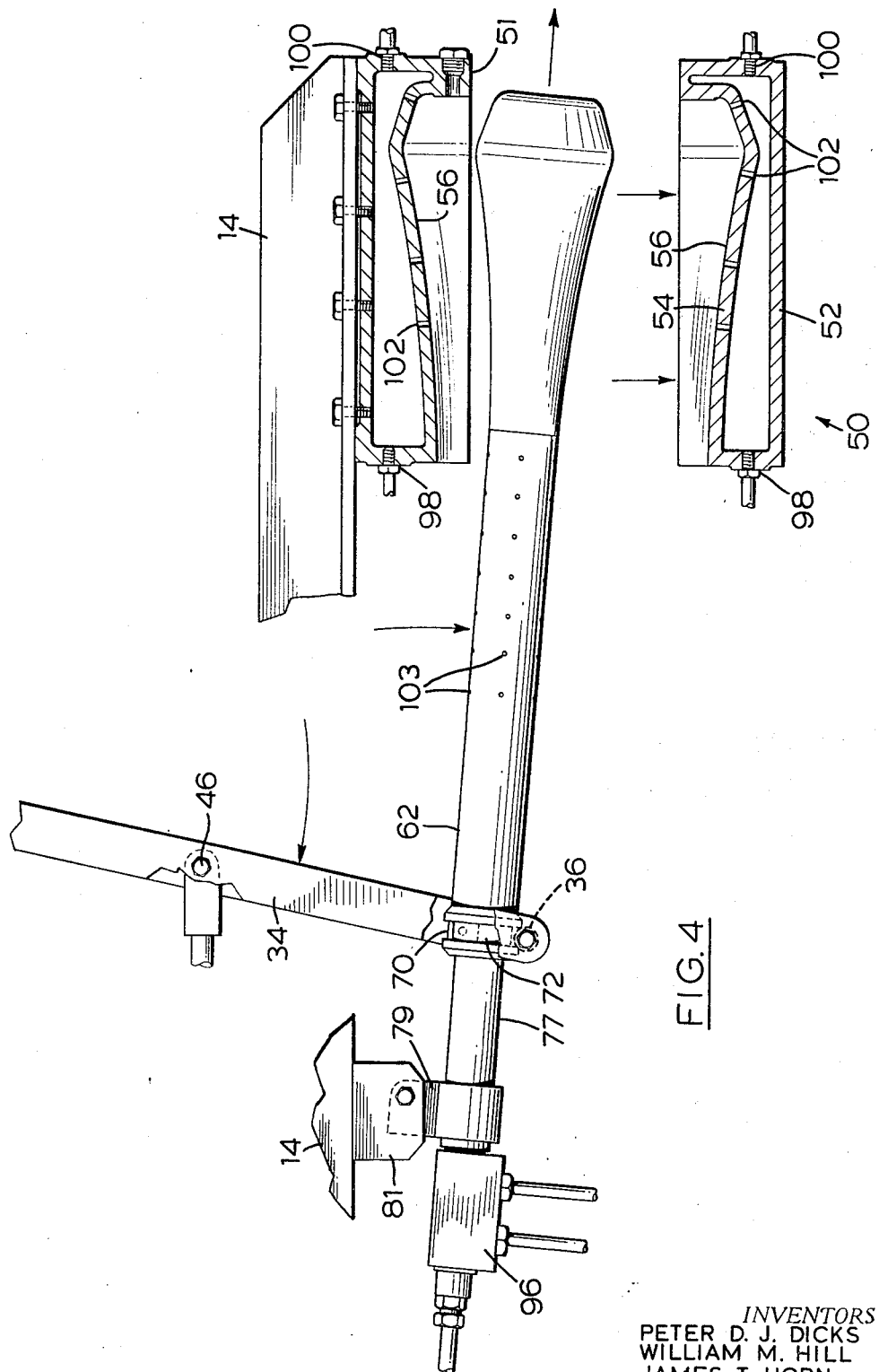

3,510,548
PROCESS FOR BLOW MOLDING FOAM PARISONS FORMED FROM EXPANDABLE POLYSTYRENE BEADS
Peter D. J. Dicks, Kitchener, Ontario, William M. Hill, Ayr, Ontario, and James T. Horn, Port Credit, Ontario, Canada, assignors to Cecil Harold Royce Day, Grimsby, Ontario, Canada
Filed Nov. 16, 1967, Ser. No. 683,656
Claims priority, application Canada, Oct. 30, 1967, 3,734
Int. Cl. B29d 23/03
U.S. Cl. 264—51                         2 Claims

ABSTRACT OF THE DISCLOSURE

The present invention relates to a method and apparatus for the manufacture of plastic articles such as bottles from a foamable plastic material such as expandable polystyrene. The apparatus of the present disclosure includes a mold which has a first molding chamber surrounded by a second molding chamber and separated therefrom by a movable wall. The movable wall is adapted to be removed from the mold to permit the parison formed within the first mold to be expanded to the contour of the second mold. In the method of the present invention the first molding chamber is charged with a foamable plastic and the foamable plastic is expanded therein to form a tubular parison. After the expansion of the plastic material within the first mold has been substantially completed the movable outer wall of the first mold is withdrawn and the parison is further expanded by blow-molding to the contour of the second mold. After the blow-molding has been completed the mold is split and the molded article removed.

Background of the invention

This invention relates to a method for the manufacture of plastic containers. In particular this invention relates to a method for manufacturing expanded foam plastic containers such as bottles and the like.

Containers made from expanded foam plastic such as polystyrene foam are popular due to the fact that they are light in weight, inexpensive to manufacture and have desirable thermo insulating properties. Expanded foam plastic containers such as polystyrene bottles have been manufactured by the well known blow-molding methods. In the known method the foam is extruded from a plastic extruder to form a tubular parison and the parison is clamped within a blow-molding mold in such a way that the top and bottom of the tube is sealed and then air is introduced to the interior of the tube to blow the parison to the shape of the blow-molding die. In the conventional method of extruding expandible polystyrene all of the expansion or foaming takes place as the material leaves the extruder die. This expansion causes a drastic lowering in the temperature of the material with the result that a great deal of difficulty is experienced when trying to seal the bottom of a parison when it is clamped within a blow-molding die. The lower temperature of the material causes frequent cracking to occur during the blowing-molding operation and in addition considerable stresses are set up within the molded container and when hot liquid is introduced into the container in use failure of the container can frequently occur as a result of these high internal stresses. The extrusion of expanded foam plastic such as polystyrene foam is extremely difficult and complex and the expansion of the extruded material as it leaves the extrusion die is such that it is extremely difficult to control the parison as it enters the blow-molding die.

Summary of the invention

The present invention overcomes the difficulties of the prior art discussed above by providing a method of forming a plastic container from expanded foam plastic which comprises the steps of forming a fully expanded hollow tubular parison with a closed end in a first molding chamber which is enclosed by a second molding surface and separated therefrom by a movable wall, withdrawing the movable wall from the mold and further forming the substantially fully foam expanded tubular parison to the contour of the second molding surface by blow-molding.

The present invention also utilizes an apparatus for molding foamable plastic material to form containers which comprises a first molding means having a first mold chamber adapted to form a hollow tubular parison or member. The first molding means comprises an inner tubular wall and an outer tubular wall. The first molding means is enclosed within a second molding surface to define a second molding chamber between the second molding surface and the outer tubular wall. Passage means is formed in the inner tubular wall, outer tubular wall and second molding surface through which steam may pass into said first mold chamber. The outer wall of said first molding means is adapted to be withdrawn from the second molding chamber after a tubular parison has been formed within the first molding means to permit the tubular parison to be blow-molded to the contour of the second mold surface. Additional passage means opens into the first molding chamber to permit the chamber to be charged with a predetermined quantity of a foamable plastic material and vent means is provided for venting the first and second chambers to permit steam to enter the first molding means and to permit air to enter the second molding means to permit blow-molding.

It is, therefore, an object of this invention to provide an improved method of manufacturing expanded foam plastic containers.

It is a further object of this invention to provide an improved method of manufacturing containers wherein two molding processes are carried out within the confines of one mold.

The present invention will be more clearly understood after reference to the detailed specification read in conjunction with the drawings, wherein:

FIG. 1 is a partially sectioned view of the molding apparatus according to an embodiment of the present invention.

FIG. 2 is a sectional view taken along the line 2—2 of FIG. 1.

FIG. 3 is a sectional view of the mold of FIG. 1 in a blow-molding position, and FIG. 4 is a partially sectioned side view of the molding apparatus in an open position.

With reference to FIG. 1 of the drawings it will be seen that the numeral 10 refers generally to a molding apparatus according to an embodiment of the present invention. The structure of the apparatus is substantially symmetrical about the section shown in FIG. 1 of the drawings and this symmetry should be noted in the consideration of the following description of the apparatus illustrated in FIG. 1.

A frame 12 consists of a U-shaped channel 14 having an anchor plate 16 rigidly welded at one end thereof. The anchor plate 16 is provided with a pair of reinforcing struts 18, only one of which is shown in the section illustrated in FIG. 1. Vertically extending support members 20 are rigidly secured at their lower ends to the upstanding arms of the U-shaped channel member 14. Each of the upstanding support members 20 is braced and rigidly supported in the vertical position by means of struts 22. The upper ends of the upstanding supports 20 are bridged by means of a bridge member 24. The support pillars 20, struts 22 and bridge member 24 are preferably made from angle iron sections rigidly welded together as illustrated in FIG. 1. A fulcrum arm 26 is welded to the center of the bridge member 24 and extends substantially horizontally outwardly therefrom. A pivot pin 30 is rigidly retained by locking grip screw 32 within the opening 28 which is formed in the arm 26. The pivot pin 32 forms a fulcrum about which a pair of spaced lever arms 34 are adapted to pivot. As shown in FIG. 2 of the drawings the arms 34 are maintained in a spaced parallel relationship by means of spacing washers 36 and clamping bolts 38 which extend between the two arms. The spacing washers 36 maintain the arms in a spaced relationship while the clamping bolts 38 maintain the rigidity of the relationship. The arms 34 extend through an elongated opening 40 which is formed in the base of the U-shaped channel 14. Pivoting movement aof the arms 34 is caused by the action of the double acting hydraulic cylinder 42 one end of which is pivotably connected to the plate 16 by means of pivot pin 42 and the other end of which is pivotably connected to the pivot pin 46 which extends between and is rigidly connected to the arms 34.

When the hydraulic cylinder 42 is actuated the arm 34 will pivot about the pivot pin 32.

The reference numeral 50 refers generally to the mold in which the containers are formed. The mold is formed in two halves which are clamped together along abutting horizontal surfaces 51 by quick release clamping bolts (not shown). Both halves of the mold consist of an outer casing 52 which is integrally formed with an inner blow-molding mold 54. The blow-mold 54 has an inner molding surface 56 which has the contour of the finished article to be produced in the molding operation. The inner molding surface 56 defines the limits of the blow-molding chamber. One end of the mold 54 is formed with an opening 60 which is adapted to slidably receive a tubular outer wall member 62 in a close fitting sliding relationship. The bore of the outer tubular wall member 62 has a highly polished surface, preferably chromium plated, to permit easy withdrawal of the tube during the molding operation as will be described hereinafter. A pressure molding chamber 64 is formed within the blow-molding chamber 58 and is defined by the outer wall 62 and the inner wall 66. The outer wall 62 and the inner wall 66 are formed with passageways 103 and 105 respectively which permit steam and/or air to pass therethrough. The inner open end of the outer wall 62 contacts one end surface of the molding surface 56 while the inner closed end of the inner wall 66 is spaced from the mold surface 56 to form a pressure molding chamber adapted to mold a hollow tubular parison having a closed end. Access to the pressure molding chamber 64 is by way of passageway 68 which has a removable closure plug 69. The pressure molding chamber 64 forms the first molding chamber and the blow-molding chamber 54 forms the second molding chamber in the sequence of operations of the apparatus.

One end of the outer wall 62 is rigidly connected to the reciprocating slide member 68 which is in turn connected to the lower end of the arm 34 by means of a pair of pivotably mounted pads 70 which co-operate with the groove 72 which is formed in the slide member 68.

One end of the guide rod 74 extends into the interior of the outer tubular wall 62 and into the opening 60 formed in the blow-mold chamber. The guide rod 74 is provided with a shoulder 76 which reacts against one end of the slide member 68 to limit the movement of the slide member. The end 78 of the guide rod 74 is rigidly secured to the inner tubular wall 66 and maintains the tubular wall in a fixed position relative to the blow-molding chamber. A bearing spacer 80 is provided between the outer wall and the end 78 of the guide rod to facilitate the sliding movement of the outer wall relative to the rigidly mounted guide rod 74.

The other end of the guide rod 74 is secured by means of a sleeve 77 which is supported by an arm 79 which is in turn pivotably mounted on a bracket 80 which is secured to the channel 14 of the frame 12. The sleeve 76 abuts against a shoulder 82 formed on the guide rail 74 to prevent movement of the guide rail in one direction and a circlip 84 surrounds the guide rail 74 at the other end of the sleeve 76 to prevent movement of the guide rail in the other direction. The guide rail 74 has a bore 86 and a tube 88 extends through the bore 86 in a spaced parallel relationship thereto. The tube 88 is secured within the bore of the guide rail 74 by means of a standard connection 90. A pair of venting ports 92 and 94 are formed in a coupling block 96 and open into the annular space 87 which is formed within the guide rail 74. The coupling member 96 is located on the shaft 74 between the circlip 84 and a circlip 85. The tube 88 has a hollow bore 89 and extends into the space formed within the inner wall 66 and is spaced from the end of the mold.

The mold housing 52 is formed with steam or cooling ports 98 and 100. The ports 98 and 100 are connected to a suitable source of high pressure steam or a source of cooling fluid as required. The wall 54 of the blow-mold is provided with a plurality of vent passageways 102 which permit the air to be evacuated from the blow-molding chamber 58. The vents 102 also permit steam to pass into the blow-molding chamber 58. As previously indicated the outer wall 62 of the pressure molding chamber 64 is formed with vent passages 103 such that steam may pass through the wall 62 to enter the pressure forming chamber. Similarly the inner wall 66 is formed with vent passages 105 such that air pressure may be applied to force a molded element outwardly from the surface of the inner tube 66 towards the molding surface 56 of the blow-mold 54.

When the apparatus is in use in the first stage of the operation the outer tubular wall 62 is located in the position shown in FIG. 1 to co-operate with the inner tubular member 66 to define the pressure molding or first molding chamber 64. The passageway 68 is open and a predetermined quantity of polystyrene or other similar foamable plastic material is introduced into the pressure molding chamber. When the mold has been filled with a predetermined quantity of foamable plastic the passageway 68 is closed and dry steam is introduced at a predetermined pressure by way of the steam ports 100 into the mold housing 52 and by way of the bore 98 of the tube 88 into the interior of the tube 66. The steam passes through the vent passageways 102 in the mold 54 and the vent passageways 103 in the outer tube 62 to contact and activate the foamable plastic material within the pressure molding chamber 64. The steam also passes through the passageways 105 formed in the inner wall 66 to contact and activate the foamable plastic. When the expansion of the foamable plastic has been completed the molding element has the form of a hollow tubular parison having one closed end. The supply of steam is then cut off and before the molding element has had an opportunity to cool the hydraulic cylinder 42 is activated and the outer cylindrical wall 62 is withdrawn from the mold by the movement of the arm 34 to the position shown in broken lines in FIG. 1. After the outer wall 64 has been withdrawn air is introduced into the interior of the molding parison by way of the hollow bore 89 of the tube 88. The passageways 105 formed in the inner tubular member 66 permit the air to force the molded article outwardly from the tube 66 towards the molding surface 56 of the blow-mold to the position shown in FIG. 3. When the article has been formed to the contour of the blow-mold the air pressure within the blow-mold is reduced and the vacuum is relieved. In order to speed the cooling of the molded article cooling fluid may be introduced into the mold by way of the steam passageways 98 or by other cooling coils positioned adjacent to the mold.

After the molded article has been cooled the mold is split along the abutting mold surfaces 51 by releasing the qiuck release clamping bolts and the lower half of the mold is removed. The arm 74 is then pivoted about the support bracket 81 and the molded article is lowered from the upper half of the mold to the position shown in FIG. 4. The molded article is then withdrawn over the outer wall forming tube 66.

In a typical molding operation which was carried out on the apparatus of the present invention and which employed a steam pressure of 50 p.s.i. and an air pressure of 100 p.s.i. bottles were made from pre-expanded polystyrene beads of a density of 3¾ lbs. per cubic foot. The predetermined quantity of beads were loaded into the mold by way of the passageway 68 and dry steam was introduced into both the outer chamber and the inner chamber through ports 98 and 88 respectively. After approximately 5 seconds the steam supply was cut off and after a further 7 seconds the outer tube 62 was withdrawn from the mold. Some 9 seconds later the steam in the outer chamber was released at a controlled speed. Thirty seconds later a short puff of air (approximately half a second) was introduced into the inner mold. The mold was allowed to cool for a further thirty-five seconds and it was then split and the molded article removed.

Various other embodiments of the present invention will be apparent to those skilled in the art without departing from the scope of the present invention. For example the two halves of the mold might readily be held together along the plane 51 by means of a hydraulic clamping device rather than the clamping bolts referred to above. Similarly alternative means may be provided for causing the outer wall 60 to be withdrawn from the mold as required in use.

What we claim is:

1. A method of forming a container in a mold including outer molding surfaces defining a blow molding chamber which surrounds an inner molding chamber having an inner wall and a movable wall surrounding it and capable of being withdrawn from the mold, and said walls and surfaces having fluid passageways therethrough, said method including the steps of: charging the inner molding chamber with a quantity of foamable pre-expanded polystyrene beads; introducing steam into the mold through the passageways in said walls and surfaces to heat the mold and to contact the beads to form a fully foamed hollow tubular parison; withdrawing said movable wall from the mold chambers; introducing air through the passageways in said inner wall to expand the parison while still heated to the contour of the blow molding chamber; and removing the molded container from the latter chamber.

2. In a method as set forth in claim 1 wherein the movable wall before withdrawal seals against the blow molding surfaces at both ends and the inner wall is closed at one end and spaced from the adjacent blow molding surfaces, the method of making a closed-end container including the steps of: introducing said beads into the space between the closed end of said inner wall and the adjacent blow molding surface; and contacting the beads in said space with said steam to form a closed-end parison; and expanding the parison to the contours of the other blow molding surfaces.

References Cited

UNITED STATES PATENTS

| | | | |
|---|---|---|---|
| 2,469,130 | 5/1949 | Rodman | 264—97 X |
| 3,002,225 | 10/1961 | Goller | 264—97 X |
| 3,144,493 | 8/1964 | Santelli | 264—51 |
| 3,225,127 | 12/1965 | Scott | 264—54 |
| 3,013,304 | 12/1961 | Richie et al. | 264—53 X |
| 3,264,381 | 8/1966 | Stevens | 264—55 X |

JULIUS FROME, Primary Examiner

P. A. LEIPOLD, Assistant Examiner

U.S. Cl. X.R.

18—5; 264—53, 94